(12) United States Patent
Chen et al.

(10) Patent No.: US 7,169,488 B2
(45) Date of Patent: Jan. 30, 2007

(54) GRANULAR PERPENDICULAR MEDIA WITH SURFACE TREATMENT FOR IMPROVED MAGNETIC PROPERTIES AND CORROSION RESISTANCE

(75) Inventors: Qixu Chen, Milpitas, CA (US); Tom Nolan, Mountain View, CA (US); Raj Nagappan Thangaraj, Fremont, CA (US); Zhong (Stella) Wu, Fremont, CA (US); Samuel Dacke Harkness, Berkeley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/705,069

(22) Filed: Nov. 10, 2003

(65) Prior Publication Data

US 2004/0247941 A1   Dec. 9, 2004

Related U.S. Application Data

(60) Provisional application No. 60/475,665, filed on Jun. 3, 2003, provisional application No. 60/475,834, filed on Jun. 3, 2003.

(51) Int. Cl.
*G11B 5/66* (2006.01)
*G11B 5/70* (2006.01)

(52) U.S. Cl. .................... 428/833.3; 428/832

(58) Field of Classification Search ............ 428/694 T, 428/694 TP, 694 TC, 694 TS, 694 TM, 336, 428/900, 832, 833.1, 833.2, 836.2, 836.3
See application file for complete search history.

(56) References Cited

U.S. PATENT DOCUMENTS 6,146,737 A * 11/2000 Malhotra et al. .......... 428/65.3
6,399,177 B1   6/2002 Fonash et al. .............. 428/119
6,461,750 B1  10/2002 Chen et al. .......... 428/694 TM
6,468,670 B1  10/2002 Ikeda et al. ................ 428/611
6,569,545 B1   5/2003 Kanbe et al. ............ 428/694 T (Continued)

FOREIGN PATENT DOCUMENTS

WO    WO 03/009280 A1 *  1/2003

OTHER PUBLICATIONS

U.S. Appl. No. 60/475,834, entitled "In-situ Post-Deposition Oxidation Treatment for Improved Perpendicular Magnetic Recording Media", by inventors Chung-Hee Chang and Charles F. Brucker, filed Jun. 3, 2003.

*Primary Examiner*—Holly Rickman
(74) *Attorney, Agent, or Firm*—Morrison & Foerster LLP

(57) ABSTRACT

A granular perpendicular magnetic recording medium having a surface treated magnetic layer comprising an oxidized or nitrogenized boundary layer formed on the surface of the magnetic layer, wherein the magnetic layer comprises granular magnetic regions having oxygen and/or nitrogen-containing grain boundaries. In one embodiment, the granular perpendicular recording medium further comprises a soft magnetic layer below the surface treated granular magnetic layer and a protective overcoat over the surface treated granular magnetic layer. A method of manufacturing a granular perpendicular magnetic recording medium includes depositing a magnetic layer having granular structure over a substrate and subsequently surface treating the granular magnetic layer in an oxygen and/or nitrogen-containing atmosphere to produce an oxidized and/or nitrogenized boundary layer formed on the surface of the granular magnetic layer. The granular perpendicular magnetic recording medium of the present invention exhibits high Hc and SNR while exhibiting improved corrosion resistance and contact start-stop performance.

11 Claims, 1 Drawing Sheet

U.S. PATENT DOCUMENTS

| | | | |
|---|---|---|---|
| 6,602,612 B2 * | 8/2003 | Abarra et al. | 428/611 |
| 6,699,600 B2 * | 3/2004 | Shimizu et al. | 428/692 |
| 2002/0037439 A1 | 3/2002 | Livinov et al. | 428/694 TM |
| 2003/0096077 A1 | 5/2003 | Ju et al. | 428/65.3 |
| 2003/0235718 A1 * | 12/2003 | Watanabe et al. | 428/694 TP |
| 2004/0101716 A1 * | 5/2004 | Mukai | 428/694 TM |

* cited by examiner

GRANULAR PERPENDICULAR MEDIA WITH SURFACE TREATMENT FOR IMPROVED MAGNETIC PROPERTIES AND CORROSION RESISTANCE

CROSS-REFERENCE TO RELATED APPLICATION

This application claims priority to U.S. Provisional Patent Application Ser. No. 60/475,665, entitled "Granular Perpendicular Media Made With Surface Treatment After The Deposition Of Magnetic Films", which was filed Jun. 3, 2003, the entire disclosure of which is hereby incorporated by reference herein. This application is related to U.S. Provisional Patent Application Ser. No. 60/475,834, entitled "In-Situ Post-Deposition Oxidation Treatment For Improved Magnetic Recording Media", by inventors Chung-Hee Chang and Charles Brucker, filed on Jun. 3, 2003, the entire disclosure of which is hereby incorporated by reference herein.

BACKGROUND OF THE INVENTION

1. Field of the Invention

Embodiments of the invention relate to perpendicular magnetic recording media, and more particularly to a surface treated granular magnetic layer exhibiting enhanced magnetic properties and improved corrosion resistance and contact start-stop performance.

2. Description of the Related Art

Perpendicular magnetic recording media are being developed for higher density recording as compared to longitudinal media. The thin-film perpendicular magnetic recording medium comprises a substrate and a magnetic layer having perpendicular magnetic anisotropy. Typically, the thin-film perpendicular magnetic recording medium comprises a rigid aluminum (Al) alloy substrate and successively sputtered layers. The sputtered layers can include one or more underlayers, one or more magnetic layers, and a protective overcoat. The protective overcoat protects the magnetic layer from corrosion and reduces frictional forces between the disc and a read/write head. In addition, a thin layer of lubricant may be applied to the surface of the protective overcoat to enhance the tribological performance of the head-disc interface by reducing friction and wear of the protective overcoat.

Granular perpendicular magnetic recording media is being developed for its capability of further extending the areal density as compared to conventional perpendicular recording which is limited by the existence of strong lateral exchange coupling between magnetic grains. A granular perpendicular recording medium comprises a granular perpendicular magnetic layer having crystalline cobalt-based magnetic columnar grains separated by grain boundaries comprising voids, oxides and/or nitrides. The grain boundaries having a thickness of about 2 Å to about 20 Å, provide a substantial reduction in the magnetic interaction between the magnetic grains. In contrast to conventional perpendicular media, wherein the perpendicular magnetic layer is typically sputtered at low pressures and high temperatures in the presence of an inert gas, such as argon (Ar), deposition of the granular perpendicular magnetic layer is conducted at relatively high pressures and low temperatures and utilizes a reactive sputtering technique wherein oxygen ($O_2$) and/or nitrogen ($N_2$) are introduced in a gas mixture of, for example, Ar and $O_2$, Ar and $N_2$, or Ar and $O_2$ and $N_2$. Alternatively, oxygen or nitrogen may be introduced by utilizing a sputter target comprising oxides and/or nitrides which is sputtered in the presence of an inert gas (e.g., Ar), or, optionally, may be sputtered in the presence of a sputtering gas comprising $O_2$ and/or $N_2$ with or without the presence of an inert gas. Not wishing to be bound by theory, the introduction of $O_2$ and/or $N_2$ provides oxides and/or nitrides that migrate into the grain boundaries, thereby providing a granular perpendicular structure having a reduced lateral exchange coupling between grains. However, the migration of oxides and/or nitrides under low atomic mobility deposition (i.e., low temperature deposition), as well as the shadowing effect of the high gas pressure reactive sputter process, produces a granular magnetic layer having a porous structure significantly more susceptible to corrosion. Furthermore, the signal-to-noise ratio (SNR) of the granular magnetic medium needs to be enhanced for high-density magnetic recording applications.

The continuing drive for increased recording areal density in the magnetic recording media industry mandates reduction of the head-to-medium separation, or more particularly the head to magnetic layer separation. As such, an increase in areal density usually requires a reduction in the thickness of the protective overcoat which constitutes part of the head to magnetic layer separation. One role of the protective overcoat is to prevent corrosion of the underlying magnetic layer, which is an electrochemical phenomenon dependent upon factors such as environmental conditions, e.g., humidity and temperature. A suitable protective overcoat must prevent migration of ions, such as cobalt (Co) and nickel (Ni), from underlying layers to the surface of the magnetic recording medium, thereby potentially forming defects such as asperities. However, as the protective overcoat thickness is reduced to below 40 Å, the magnetic layer becomes more vulnerable to corrosion. Such a low thickness reduces the ability of the protective overcoat to maintain adequate corrosion protection.

Accordingly, there exists a need for granular perpendicular magnetic recording media having a granular magnetic layer exhibiting enhanced magnetic properties and improved corrosion resistance. In particular, there is a need for granular perpendicular magnetic recording media suitable for high areal density and reduced head-to-medium separation applications, exhibiting enhanced magnetic properties and improved corrosion resistance while simultaneously providing improved contact start-stop performance.

SUMMARY OF THE INVENTION

In one embodiment, the invention provides a granular perpendicular magnetic recording medium comprising a substrate, a surface treated granular magnetic layer comprising a boundary layer formed on the surface of the granular magnetic layer, wherein the granular magnetic layer has a granular structure comprising magnetic grains separated by grain boundaries, the grain boundaries comprising at least one of oxygen and nitrogen, and a protective overcoat formed over the surface treated granular magnetic layer. In one preferred embodiment, the granular perpendicular recording medium further comprises an adhesion enhancement layer, a soft magnetic layer, a seed layer, and an interlayer below the surface treated granular magnetic layer. Another embodiment comprises a method of manufacturing a granular perpendicular magnetic recording medium comprising depositing a granular magnetic layer having granular structure over a substrate, wherein the granular structure comprises magnetic grains separated by grain boundaries, the grain boundaries comprising at least one of oxygen and nitrogen, and surface treating the granular magnetic layer in an atmosphere comprising at least one of oxygen and nitrogen to produce a surface treated granular magnetic layer comprising a boundary layer formed on the surface of the granular magnetic layer.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawing. It is to be noted, however, that the appended drawing illustrates only typical embodiments of this invention and is therefore not to be considered limiting of its scope, for the invention may admit to other equally effective embodiments.

DETAILED DESCRIPTION OF THE INVENTION

Figure 1:
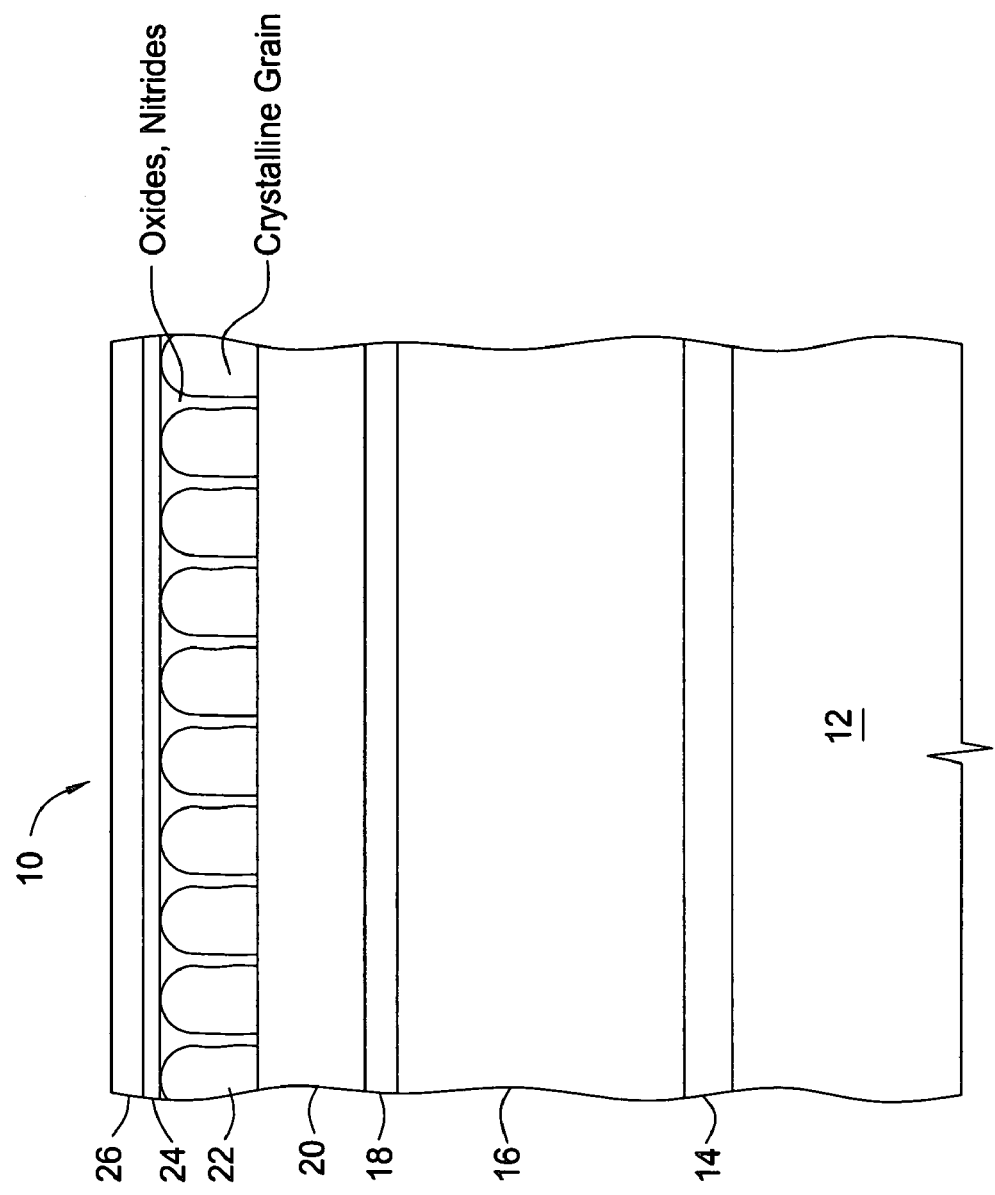
FIG. 1 schematically depicts a cross-sectional view of a portion of the layer structure in accordance with a granular perpendicular recording medium of present invention.

The invention generally provides a granular perpendicular recording medium comprising a substrate and a granular magnetic layer, wherein the granular magnetic layer is surface treated prior to deposition of a protective overcoat. In particular, one surface treatment process is to expose the granular magnetic layer to atmosphere prior to the deposition of a protective overcoat. This process wherein the protective overcoat is deposited after surface treating the granular magnetic layer is referred to as an ex-situ process. In contrast, conventional practice is to deposit the protective overcoat after the granular magnetic layer deposition process is completed without breaking the vacuum of the sputtering apparatus between deposition processes. This process wherein the protective overcoat is deposited directly onto the granular magnetic layer without surface treatment of the granular magnetic layer is referred to as an in-situ process.

In one embodiment, the magnetic medium is a granular perpendicular recording medium comprising a substrate and a granular magnetic layer, wherein the granular magnetic layer is surface treated prior to deposition of a protective overcoat. Many other granular perpendicular recording media configurations are possible, for example the granular magnetic layer may comprise a single granular magnetic layer, or may comprise a granular magnetic layer and multiple adjacent granular or non-granular magnetic layers, or may comprise a granular magnetic layer and a plurality of granular or non-granular magnetic layers forming a laminated structure having a non-magnetic spacing. Optionally, there may be one or more underlayers between the granular magnetic layer and the substrate, and there may be one or more layers between the surface treated granular magnetic layer and the protective overcoat. The one or more underlayers include one or more adhesion enhancement layers, one or more soft magnetic layers, one or more seed layers, and one or more interlayers. For example, the one or more soft magnetic layers may comprise a plurality of soft magnetic layers having a laminated configuration with or without one or more non-magnetic spacing layers. The protective overcoat may comprise one or more layers and, optionally, a lubricant layer may be applied over the surface of the protective overcoat.

In a preferred embodiment, as illustrated in FIG. 1, the granular perpendicular magnetic recording medium 10 comprises a substrate 12, and various sputtered thin-film layers including an adhesion enhancement layer 14 having a thickness in the range of about 10 Å to about 50 Å, a soft magnetic layer 16 having a thickness in the range of about 500 Å to about 4000 Å, a seed layer 18 having a thickness in the range of about 5 Å to about 50 Å, an interlayer 20 having a thickness in the range of about 20 Å to about 1000 Å, a granular magnetic layer 22 having a granular structure and having a thickness of about 50 Å to about 200 Å, a thin boundary layer 24 having a thickness of about 2 Å to about 10 Å, and a protective overcoat layer 26 having a thickness of about 20 Å to about 70 Å.

Substrate materials generally include NiP-plated Al alloy, glass, glass-ceramic, ceramic, or other non-magnetic materials. The substrate may also be a textured substrate, such as a conventionally NiP-plated textured aluminum substrate or a textured glass-ceramic substrate. Adhesion enhancement layer materials include titanium (Ti), titanium-chromium (TiCr), and chromium (Cr). The soft magnetic layer comprises magnetically soft materials generally including iron (Fe) and cobalt (Co) alloys, for example alloys of iron and nickel (FeNi), alloys of iron and nitrogen (FeN), alloys of iron, tantalum and carbon (FeTaC), alloys of iron, tantalum and nitrogen (FeTaN), alloys of iron and cobalt (FeCo), alloys of iron, cobalt and boron (FeCoB), alloys of iron, silicon and aluminum (FeSiAl), alloys of cobalt, zirconium and niobium (CoZrNb), and alloys of cobalt, zirconium and tantalum (CoZrTa). Applicable seed layer materials include tantalum (Ta), silver (Ag), copper (Cu), gold (Au), and platinum (Pt). The interlayer may include ruthenium (Ru), Ru alloys, such as RuCr, and non-magnetic cobalt-chromium (CoCr) optionally having a third element selected from the group comprising Pt, molybdenum (Mo), Ta, niobium (Nb), boron (B), carbon (C), and Ru. The interlayer provides a crystalline seed layer for the subsequently deposited magnetic layer. The granular magnetic layer includes Co-based alloys comprising oxides and nitrides, for example cobalt-platinum oxides (CoPtO), cobalt-chromium-platinum oxides (CoCrPtO), cobalt-chromium-platinum-tantalum oxides CoCrPtTaO, cobalt-platinum-titanium oxides (CoPtTiO), cobalt-chromium-platinum-titanium oxides (CoCrPtTiO), cobalt-chromium-platinum-aluminum oxides (CoCrPtAlO), cobalt-platinum-silicon oxides (CoPtSiO), cobalt-chromium-platinum-zirconium oxides (CoCrPtZrO), cobalt-chromium-platinum-hafnium oxides (CoCrPtHfO), cobalt-chromium-platinum-niobium oxides (CoCrPtNbO), cobalt-chromium-platinum-boron oxides (CoCrPtBO), cobalt-chromium-platinum-silicon oxides (CoCrPtSiO), cobalt-platinum-silicon nitrides (CoPtSiN), cobalt-platinum-tungsten nitrides (CoPtWN), cobalt-chromium-platinum-tantalum nitrides (CoCrPtTaN), cobalt-platinum-tantalum nitrides (CoPtTaN), and cobalt-chromium-platinum-silicon nitrides (CoCrPtSiN), wherein the granular magnetic layer comprises oxygen and/or nitrogen in a concentration of about 3 atomic % to about 40 atomic %, preferably in the range of about 10 atomic % to about 30 atomic %. A protective overcoat is applied over the granular magnetic layer, such as a carbon-containing protective overcoat, and a lubricant layer may be applied thereon.

A method of manufacturing a granular perpendicular magnetic recording medium of the present invention comprises surface treating a granular magnetic layer prior to depositing a protective overcoat. The granular magnetic layer is manufactured by reactive sputtering a Co-containing target in the presence of a sputtering gas comprising oxygen and/or nitrogen, or by sputtering a cobalt-containing and oxide-containing, and/or nitride-containing, target in an inert sputtering gas (e.g., argon) with or without the presence of oxygen and/or nitrogen gas, so as to achieve a granular magnetic layer comprising an oxygen and/or nitrogen concentration of about 3 atomic % to about 40 atomic %. The reactive sputter deposition process may be carried out in the presence of a gas mixture comprising an inert gas, such as argon (Ar), and oxygen ($O_2$) and/or nitrogen ($N_2$) wherein the $O_2$ and/or $N_2$ concentration at the inlet of the deposition chamber is, for example, about 0.1 vol. % to about 10 vol. % of the gas mixture depending upon the sputter rate. Higher sputter rates require a higher inlet concentration of $O_2$ and/or $N_2$. Deposition of the granular magnetic layer is carried out at relatively high pressures ranging from about 3 mTorr to about 100 mTorr, preferably from about 10 mTorr to about 50 mTorr, and at relatively low temperatures ranging from about 20° C. (ambient) to about 100° C. The resulting granular cobalt-containing magnetic layer has a granular structure and a composition comprising oxygen and/or nitrogen in a concentration of about 3 atomic % to about 40 atomic %. The granular structure comprises crystalline magnetic grains separated by grain boundaries, wherein the grain boundaries comprise oxygen and/or nitrogen. Not wishing to be bound by theory, it is believed that oxygen and nitrogen is incorporated into the grain boundaries in the form of oxides and nitrides, and thereby-provide reduced coupling between magnetic grains of the granular magnetic layer, as depicted in FIG. 1. Additionally there may be, some inclusion of oxygen and/or nitrogen within the crystalline magnetic grain, however most of the oxygen and nitrogen is present in the grain boundaries.

After depositing the granular magnetic layer, the granular magnetic layer undergoes a surface treatment process wherein the granular magnetic layer is exposed to an atmosphere comprising oxygen and/or nitrogen for a period of time ranging from about 1 second to about 1 hour, preferably from about 3 seconds to about 10 minutes. The surface treatment process may be carried out by simply removing the substrate from the deposition chamber such that the surface of the granular magnetic layer may oxidize in the presence of the oxygen-containing atmosphere (e.g., clean room air). During the surface treatment process, the surface of the magnetic layer reacts with the oxygen in the atmosphere, thereby forming an oxidized boundary layer on the surface of the granular magnetic layer. Similarly, the surface treatment process may be carried out by exposing the granular magnetic layer to a nitrogen-containing atmosphere within the deposition chamber, such that a boundary layer comprising nitrogen (e.g., nitrides) may form over the surface of the granular magnetic layer. In addition, the surface treatment process may be carried out in an atmosphere comprising both oxygen and nitrogen such that the boundary layer formed over the surface of the granular magnetic layer comprises both oxygen and nitrogen (e.g., oxides and nitrides).

Many other manufacturing processes for preparing a surface treated granular magnetic layer of the present invention are also possible. The surface treatment process may be carried out in a wide variety of oxygen and/or nitrogen containing environments. For example, after depositing the granular magnetic layer in the presence of Ar and $O_2$, the surface treatment process to form the oxidized boundary layer on the surface of the magnetic layer may be carried out in the same deposition chamber, or another deposition chamber, wherein oxygen gas is introduced into the chamber in any oxygen-containing medium, such as a gas mixture medium comprising $O_2$ and $N_2$, or $O_2$ and Ar and/or other inert gas, at the same or different oxygen concentration as may have been used during deposition of the granular magnetic layer.

As illustrated in the following examples, surface treatment of the granular magnetic layer in perpendicular recording media prior to protective overcoat deposition, provides media having enhanced magnetic properties including coercivity (Hc) and signal-to-noise ratio (SNR), which are critical to the recording performance of these materials, as well as improved corrosion resistance and contact start-stop performance.

EXAMPLES

The following examples describe embodiments of the present invention and such examples are offered by way of illustration and not by way of limitation.

Example 1

Samples were prepared comprising granular perpendicular media having ion-beam deposited (IBC) carbon overcoats deposited ex-situ, according to the present invention, and IBC carbon overcoats deposited in-situ. The granular perpendicular magnetic recording medium comprising a rigid Al alloy substrate and successively sputtered layers comprising a Ti layer having a thickness of about 30 Å, a iron-cobalt-boron (FeCoB) layer having a thickness of about 800 Å, a Ta layer having a thickness of about 25 Å, a second FeCoB layer having a thickness of about 800 Å; a Ag layer having a thickness of about 15 Å, a RuCr layer having a thickness of about 200 Å, a cobalt-platinum oxide ($CoPtO_x$) layer having a thickness of about 65 Å and about 70 Å for the media made ex-situ and in-situ, respectively, and an IBC deposited carbon overcoat having a thickness of about 30 Å. The samples prepared ex-situ further comprise an oxidized boundary layer having a thickness of about 5 Å formed directly on the granular magnetic layer by exposing the granular magnetic layer to an atmosphere of clean room air for about 5 minutes prior to deposition of the IBC carbon overcoat. The IBC deposited carbon overcoats were fabricated ex-situ and in-situ using an Intevac sputter machine wherein the ion beam deposition process includes substrate etching in an Ar atmosphere for about 0.5 seconds before ion beam depositing the carbon overcoat using a substrate bias of about 120 V. The granular magnetic layers comprising oxygen, $CoPtO_x$, were produced by reactive sputtering a CoPt target in the presence of an Ar and $O_2$ gas mixture, wherein the oxygen was about 0.7 vol. % of the gas mixture at the inlet of the deposition chamber, at a pressure of about 30 mTorr and a temperature at ambient room temperature.

The coercivity (Hc) values were obtained from Kerr magnetometer measurements of the samples. The medium signal-to-noise ratio (SMNR) values of the samples were measured under 500 kfci (kilo flux reversal per inch) with a recording head having a single pole inductive write element and a giant magneto-resistive (GMR) reader sensor. As shown in Table 1, the media with IBC films formed ex-situ have a much higher Hc and SMNR as compared to the media with IBC films formed in-situ. The ex-situ deposition of the carbon overcoat after exposing the granular magnetic layer to atmosphere, provides perpendicular media having enhanced Hc and SNR which are critical to the recording performance of these materials.

TABLE 1

| Carbon process | Hc (kOe) | SMNR (dB) |
|---|---|---|
| In-situ | 5.02 | 15.0 |
| Ex-situ | 5.45 | 16.1 |

Example 2

Samples were prepared comprising granular perpendicular media having granular magnetic layers comprising different amounts of oxygen, and IBC carbon overcoats deposited ex-situ, according to the present invention, and a-CH carbon overcoats deposited in-situ. The granular perpendicular magnetic recording medium comprising a rigid Al alloy substrate and successively sputtered layers comprising a Ti layer having a thickness of about 35 Å, a FeCoB layer having a thickness of about 600 Å, a tantalum oxide (TaO$_x$) layer having a thickness of about 20 Å, a second FeCoB layer having a thickness of about 600 Å, a second TaO$_x$ layer having a thickness of about 20 Å, a third FeCoB layer having a thickness of about 500 Å, a Cu layer having a thickness of about 20 Å, a RuCr layer having a thickness of about 180 Å, a cobalt-chromium-platinum oxide-silicon dioxide (CoCrPtO$_y$—SiO$_2$) layer having a thickness of about 85 Å and about 90 Å for the media made ex-situ and in-situ, respectively, and a carbon overcoat having a thickness of about 60 Å. The samples prepared ex-situ further comprise an oxidized boundary layer having a thickness of about 5 Å formed on the granular magnetic layer by exposing the granular magnetic layer to an atmosphere of clean room air for about 5 minutes prior to deposition of the IBC carbon overcoat. The granular magnetic layers comprising oxygen, CoCrPtO$_y$—SiO$_2$, were produced by sputtering a CoCrPt—SiO$_2$ target in the presence of an Ar and O$_2$ gas mixture, wherein the oxygen concentration of the gas mixture at the inlet of the deposition chamber was varied from about 0.82 vol. % to about 1.04 vol. %, at a processing pressure of about 30 mTorr and a temperature at ambient room temperature. The in-situ carbon overcoats were hydrogenated carbon films a-CH fabricated in-situ (i.e., without breaking the vacuum). The ex-situ carbon overcoats were IBC deposited carbon films fabricated using an Intevac sputter machine wherein the ion beam deposition process includes substrate etching in an Ar atmosphere for about 0.5 seconds before ion beam depositing the carbon overcoat using a substrate bias of about 120 V.

The Hc and SMNR values of the samples were measured using the same measurement techniques as described in Example 1. As shown in Table 2, for each oxygen content, the media with IBC carbon overcoats formed ex-situ have a higher Hc and SMNR as compared to the conventionally deposited a-CH carbon overcoats formed in-situ. Furthermore, as illustrated in Table 2, the amount of oxygen incorporated into the granular magnetic layer may be optimized for a particular granular perpendicular recording media structure and particular processing parameters. The ex-situ deposition of the carbon overcoat after exposing the granular magnetic layer to atmosphere, provides perpendicular media having enhanced Hc and SMNR which are critical to the recording performance of these materials.

TABLE 2

| Oxygen (vol. %) | Hc (kOe) | | SMNR (dB) | |
|---|---|---|---|---|
| | In-situ | Ex-situ | In-situ | Ex-situ |
| 0.82 | 5.41 | 5.53 | 10.70 | 10.83 |
| 0.90 | 5.45 | 5.66 | 10.87 | 11.10 |
| 0.97 | 5.35 | 5.63 | 11.01 | 11.22 |
| 1.04 | 5.27 | 5.50 | 10.85 | 11.13 |

The exact mechanism involved during the surface treatment process and subsequent IBC carbon deposition resulting in enhanced Hc and SNR properties of the granular perpendicular media is not known with certainty. However, not wishing to be bound by theory, it is believed that during the ion beam deposition process the high-energy etching Ar ions and depositing carbon atoms impinging upon the oxidized boundary layer force more oxides from the boundary layer into the grain boundaries of the granular magnetic layer, and thereby further enhance the decoupling of the surface-treated magnetic grains which thereby further enhances Hc and SMNR. Concurrently, high-energy etching Ar ions and depositing carbon atoms impinging upon the oxidized boundary layer provide additional energy for oxygen diffusion or migration along the grain boundaries and further into the grain boundaries which also enhances magnetic decoupling of the magnetic grains.

Example 3

A corrosion performance test was performed on samples comprising ex-situ and in-situ deposited IBC carbon overcoats. The granular perpendicular magnetic recording medium comprising a rigid Al alloy substrate and successively sputtered layers comprising a Ti layer having a thickness of about 35 Å, a FeCoB layer having a thickness of about 800 Å, a TaO$_x$ layer having a thickness of about 25 Å, a second FeCoB layer having a thickness of about 800 Å, a Ta layer having a thickness of about 25 Å, a Ru layer having a thickness of about 175 Å, a cobalt-platinum oxide (CoPtO$_y$) layer having a thickness of about 65 Å and about 70 Å for the media made ex-situ and in-situ, respectively, and an IBC deposited carbon overcoat having a thickness of about 30 Å. The samples prepared ex-situ further comprise an oxidized boundary layer having a thickness of about 5 Å formed on the granular magnetic layer by exposing the granular magnetic layer to an atmosphere of clean room air for about 5 minutes prior to deposition of the IBC carbon overcoat. The IBC deposited carbon overcoats were fabricated ex-situ and in-situ using an Intevac sputter machine wherein the ion beam deposition process includes substrate etching in an Ar atmosphere for about 0.5 seconds before ion beam depositing the carbon overcoat using a substrate bias of about 120 V. The granular magnetic layers comprising oxygen, CoPtO$_y$, were produced by sputtering a CoPt target in the presence of an Ar and O$_2$ gas mixture, wherein the oxygen was about 0.7 vol. % of the mixture at the inlet of the deposition chamber, at a pressure of about 30 mTorr and a temperature at ambient room temperature.

Prior to corrosion performance testing, the surface roughnesses (Ra) of the samples, as measured by atomic force microscopy (AFM) using a scan of about 1 µm×1 µm, were all less than about 5 Å and all surfaces were void of oxide particles. During corrosion performance testing, the samples were exposed to a temperature of 80° C. and 80% relative humidity, referred to as an 80—80 T/H environmental test, for a period of four days. Subsequent AFM measurements of the media showed a high density of large cobalt oxide particles present on the surfaces of the media fabricated using in-situ carbon overcoat deposition, whereas there was a low density of small cobalt oxide particles on the media fabricated using ex-situ carbon overcoat deposition. The detrimental growth of oxides under corrosive conditions is considerably reduced on the media fabricated using ex-situ carbon overcoat deposition rather than in-situ deposition of the carbon overcoat. Not wishing to be bound by theory, the improved corrosion performance exhibited by the samples having ex-situ deposited carbon overcoats suggests that the passive oxide boundary layer formed on the surface of the magnetic layer during surface treatment creates a barrier to the diffusion of electrochemically active species originating from the magnetic layer.

Example 4

Contact start-stop (CSS) tests were performed on samples comprising ex-situ and in-situ deposited IBC carbon overcoats. The granular perpendicular magnetic recording medium comprising a rigid Al alloy substrate and successively sputtered layers comprising a Ti layer having a thickness of about 30 Å, a FeCoB layer having a thickness of about 800 Å, a Ta layer having a thickness of about 25 Å, a second FeCoB layer having a thickness of about 800 Å, a Ag layer having a thickness of about 15 Å, a RuCr layer having a thickness of about 200 Å, a cobalt-chromium-platinum oxide ($CoCrPtO_x$) layer having a thickness of about 65 Å and about 70 Å for the media made ex-situ and in-situ, respectively, and an IBC deposited carbon overcoat having a thickness of about 30 Å. The samples prepared ex-situ further comprise an oxidized boundary layer having a thickness of about 5 Å formed on the granular magnetic layer by exposing the granular magnetic layer to an atmosphere of clean room air for about 5 minutes prior to deposition of the IBC carbon overcoat. The IBC deposited carbon overcoats were fabricated ex-situ and in-situ using an Intevac sputter machine wherein the ion beam deposition process includes substrate etching in an Ar atmosphere for about 0.5 seconds before ion beam depositing the carbon overcoat using a substrate bias of about 120 V. The granular magnetic layers comprising oxygen, $CoCrPtO_x$, were produced by sputtering a CoCrPt target in the presence of an Ar and $O_2$ gas mixture, wherein the oxygen was about 0.7 vol. % of the mixture at the inlet of the deposition chamber, at a pressure of about 30 mTorr and a temperature at ambient room temperature. The ex-situ deposited IBC carbon overcoats performed more than 20,000 CSS cycles, whereas the in-situ deposited IBC carbon overcoats experienced head crash in less than only 500 CSS cycles. The high failure rate of the in-situ IBC carbon overcoat samples is attributed primarily to the relative high waviness of the in-situ deposited samples. In contrast, the ex-situ deposited IBC carbon overcoat samples are much smoother due to the combination of the smoothening effect of the oxidized boundary layer formed on the surface of the granular magnetic layer, the bombardment effect of etching Ar ions, and the substrate bias.

Surface roughnesses of ex-situ deposited IBC carbon overcoats, for various embodiments of the present invention, and in-situ deposited IBC carbon overcoats were examined by cross-section TEM. The cross-section TEM results show much higher surface waviness at both the top and bottom surfaces of the carbon films for in-situ deposited IBC carbon overcoat media as compared to the ex-situ deposited IBC carbon overcoat media comprising an oxidized boundary layer. In addition to increasing the flyability, as illustrated in Example 4, the ex-situ deposited carbon overcoat enhances the durability of the media due to the better surface coverage achieved by the thin carbon film deposited on the smoother surface of the boundary layer of media made ex-situ as compared to the surface coverage of the thin carbon film made in-situ. The better coverage of the ex-situ deposited carbon overcoats enhances the corrosion resistance of the media.

While the foregoing is directed to embodiments of the present invention, other and further embodiments of the invention may be devised without departing from the basic scope thereof, and the scope thereof is determined by the claims that follow.

What is claimed is:

1. A granular perpendicular magnetic recording medium, comprising:
   a substrate;
   a surface treated granular magnetic layer formed over the substrate comprising a granular magnetic layer and a boundary layer comprising an oxide or a nitride of a component of the granular magnetic layer formed directly on the surface of the granular magnetic layer, wherein the granular magnetic layer has a granular structure comprising magnetic grains separated by grain boundaries, the grain boundaries comprising at least one of oxygen and nitrogen; and
   a protective overcoat formed over the surface treated granular magnetic layer,
   wherein the granular magnetic layer and the boundary layer comprises cobalt-based alloy comprising an oxide or a nitride and the protective overcoat comprises a carbon-containing overcoat, the carbon-containing overcoat having a thickness in the range of about 20 Å to about 70 Å, further comprising at least one interlayer, wherein the at least one interlayer comprises a first material selected from the group consisting of Ru, RuCr, and non-magnetic CoCr.

2. The granular perpendicular magnetic recording medium of claim 1, wherein the granular magnetic layer further comprises at least one material selected from the group consisting of Cr, Pt, B, Ta, Nb, Si, Al, Zr, Hf, and Ti.

3. The granular perpendicular magnetic recording medium of claim 1, wherein said grain boundaries of the granular magnetic layer has a thickness in the range of about 2 Å to about 20 Å.

4. The granular perpendicular magnetic recording medium of claim 1, wherein the first material is non-magnetic CoCr, wherein the interlayer further comprises a second material selected from the group consisting of Pt, Mo, Ta, Nb, B, C, and Ru.

5. The granular perpendicular magnetic recording medium of claim 1, further comprising at least one soft underlayer.

6. The granular perpendicular magnetic recording medium of claim 5, wherein the at least one soft underlayer comprises iron or cobalt.

7. The granular perpendicular magnetic recording medium of claim 6, wherein the at least one soft underlayer further comprises a material selected from the group consisting of Ni, N, Ta, C, B, Si, Al, Zr, and Nb.

8. The granular perpendicular magnetic recording medium of claim 5, further comprising at least one seed layer.

9. The granular perpendicular magnetic recording medium of claim 8, wherein the seed layer comprises a material selected from the group consisting of Ta, Ag, Cu, Au, and Pt.

10. The granular perpendicular magnetic recording medium of claim 1, further comprising:

at least one soft magnetic layer formed over the substrate;
at least one interlayer formed over the soft magnetic layer;
wherein the granular magnetic layer is on the interlayer.

11. The granular perpendicular magnetic recording medium of claim 10 further comprising at least one seed layer on the soft underlayer, wherein the interlayer is on the seed layer.

* * * * *